United States Patent
Tominaga et al.

(10) Patent No.: US 6,340,813 B1
(45) Date of Patent: Jan. 22, 2002

(54) VARIABLE-APERTURE OPTICAL NEAR-FIELD PROBE

(75) Inventors: Junji Tominaga; Takashi Nakano; Nobufumi Atoda, all of Tsukuba; Motonobu Kourogi, Yokohama; Motoichi Ohtsu, Tokyo-to, all of (JP)

(73) Assignee: Japan as represented by Secretary of Agency of Industrial Science and Technology, Tokyo-To (JP)

( * ) Notice: Subject to any disclaimer, the term of this patent is extended or adjusted under 35 U.S.C. 154(b) by 0 days.

(21) Appl. No.: 09/496,050

(22) Filed: Feb. 2, 2000

(30) Foreign Application Priority Data

Feb. 2, 1999 (JP) .............................. 11-024576

(51) Int. Cl.[7] .............................. H01J 3/14; H01J 5/16; H01J 40/14
(52) U.S. Cl. ........................................ 250/216; 250/306
(58) Field of Search .............................. 250/216, 201.3, 250/306, 307

(56) References Cited

U.S. PATENT DOCUMENTS

| 5,485,536 A | 1/1996 | Islam |
| 5,625,617 A | 4/1997 | Hopkins et al. |
| 5,633,972 A | 5/1997 | Walt et al. |
| 5,767,891 A | 6/1998 | Hirokane et al. |
| 5,982,409 A | 11/1999 | Hirokane et al. |
| 6,104,030 A | * 8/2000 | Chiba et al. ............... 250/306 |

FOREIGN PATENT DOCUMENTS

JP  6-331805  12/1994

OTHER PUBLICATIONS

Optical Society of America, Vo. 37, No. 31, Nov. 1, 1998, entitled "Chemically Etched Fiber Tips for Near–Field Optical Microscopy: A Process for Smoother Tips".

* cited by examiner

Primary Examiner—Robert H. Kim
Assistant Examiner—Courtney Thomas
(74) Attorney, Agent, or Firm—Wenderoth, Lind & Ponack, L.L.P.

(57) ABSTRACT

Disclosed is an improved optical near-field probe for optical near-field microscopy or optical near-field recording having an effective aperture diameter variable to comply with different applications. The improvement comprises attaching, to the aperture end opening of an optical fiber-based probe, a thin film made from a substance which is opaque but capable of being rendered transparent, such as antimony or photo-chromic compounds, by irradiation with light so that the center area only of the end opening becomes transparent and transmits the laser beam to serve as an effective aperture of a diameter variable depending on the intensity of the light.

8 Claims, 2 Drawing Sheets

VARIABLE-APERTURE OPTICAL NEAR-FIELD PROBE

BACKGROUND OF THE INVENTION

The present invention relates to an optical near-field probe of which the aperture diameter is variable by irradiation with light of an intensity to exceed a critical level.

Optical near-field probes with an aperture are widely employed in optical near-field microscopes or in the technology of optical near-field recording. The optical near-field probe mentioned above in general has a structure consisting of an optical fiber or glass capillary having a sharpened pin-point end and covered with a metallic sheath on the side surface for light shielding, of which the axial center line serves to provide a channel for light transmission and an aperture opening is provided on one end for introduction of incident light. When a laser beam is introduced into the probe at the end opposite to the pin-point sharpened end, an optical near-field spot is formed at the aperture. Since the diameter of the thus formed light spot is approximately equal to that of the aperture, an optical near-field microscope having a resolving power of the wavelength of the light or smaller can be obtained by using an aperture having a diameter not exceeding the wavelength of the light. It is also possible to conduct writing-in or reading-out of a mark having a dimension smaller than the wavelength of the light by utilizing this principle. Thus, optical near-field microscopes and optical near-field recording technology are now under way of development by utilizing the optical near-field performance.

A problem in the optical near-field probe having an aperture developed heretofore is that the aperture has a fixed dimension not to be in compliance with a variety of applications in which the diameter of the light spot is desired to be variable. For example, while a probe having an aperture of a large diameter can give a large transmissivity of light and is suitable for scanning at a high velocity, the resolving power cannot be high enough and a probe having a small aperture cannot give a high transmissivity of light not to enable scanning at a high velocity though advantageous in respect of the resolving power.

When an optical near-field microscope is used for observation of a very fine object, view field location must first be conducted with high-velocity scanning over a relatively wide area followed by high-resolution observation of a specific narrow target view field. It is of course that these processes can hardly be complied by using a single probe of a fixed dimension. The idea of using two replaceable probes having different aperture dimensions is practically not feasible because, even by setting aside the problem of troublesomeness for exchanging the probes from one to the other depending on the object of observation taking a time, it is an extremely difficult matter to ensure good centering of the view fields by exchange of the probes because of the reproducibility limit in the exactness of probe mounting.

While, as is mentioned above, the transmissivity of light through an aperture is decreased as the aperture diameter is decreased, the inventors have come to a finding that the transmissivity of light through an aperture of an extremely small diameter can be kept high when the light channel reaching the aperture has such a configuration as to ensure little attenuation of the light.

It is, however, a difficult matter to prepare a glass capillary-based probe having such a controlled configuration which must be provided with a pin-point sharpened end by drawing a glass capillary under heating. Although it is possible in principle to accomplish the configuration of the light channel having a profile as desired by the method for sharpening an end of an optical fiber-based probe by utilizing the method of anisotropic etching in which the etching process is conducted in several steps under varied conditions, this method is not suitable for obtaining probes as desired with good reproducibility.

SUMMARY OF THE INVENTION

The present invention accordingly has an object, in view of the above described problems in the prior art, to provide an optical near-field probe having an aperture of a small dimension to give a high transmissivity of light which is capable of exhibiting performance of probes having different aperture diameters.

Thus, the present invention provides an optical near-field probe having an objective end opening to which a thin film of an opaque material capable of being reversibly rendered transparent by irradiation with light is attached so as to work as a variable-aperture optical near-field probe.

In particular, the material of the thin film susceptible to the change of light transmissivity by irradiation with light is antimony or a photochromic compound.

DETAILED DESCRIPTION OF THE PREFERRED EMBODIMENTS

Figure 1:
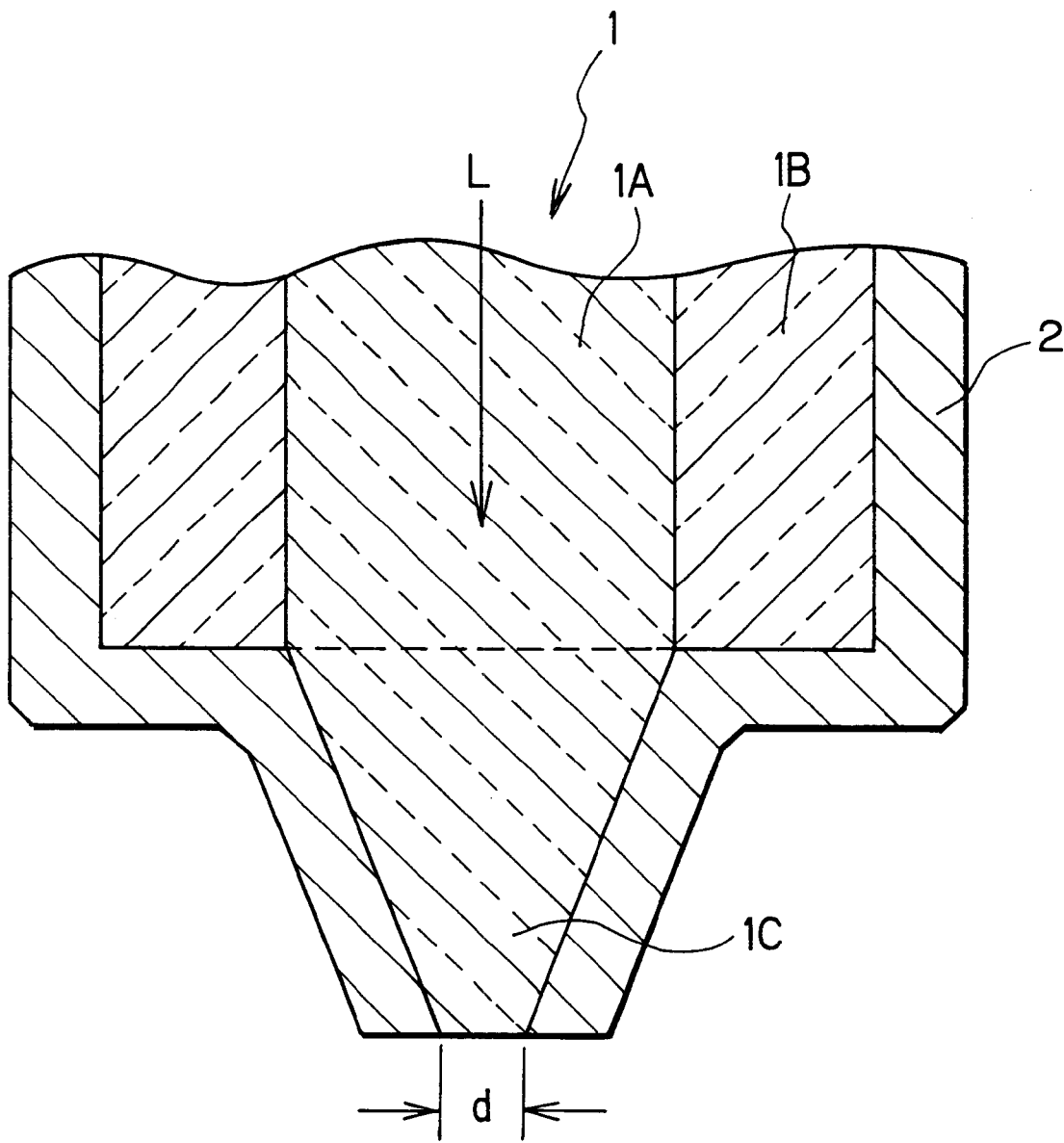
FIG. 1 is a schematic axial cross sectional view of a conventional optical fiber-based optical near-field probe.

In the first place, a typical structure of a conventional optical fiber-based optical near-field probe is described by making reference to FIG. 1 which schematically shows an axial cross sectional view of the probe.

The optical fiber 1 consisting of a core 1A of high refractive index and a cladding layer 1B of low refractive index is subjected to an etching treatment so as to expose the core 1A at one end into a truncated conical part 1C of which the top flat to serve as an objective opening has a diameter d. The thus fabricated optical fiber is coated with a light-shielding film 2 of an opaque material such as a metal excepting the top flat surface of the truncated conical part 1C. The aperture diameter d is invariable for a probe as determined by the cutting height of the conical end portion of the core 1A to form the truncated conical part 1C.

Figure 2A:
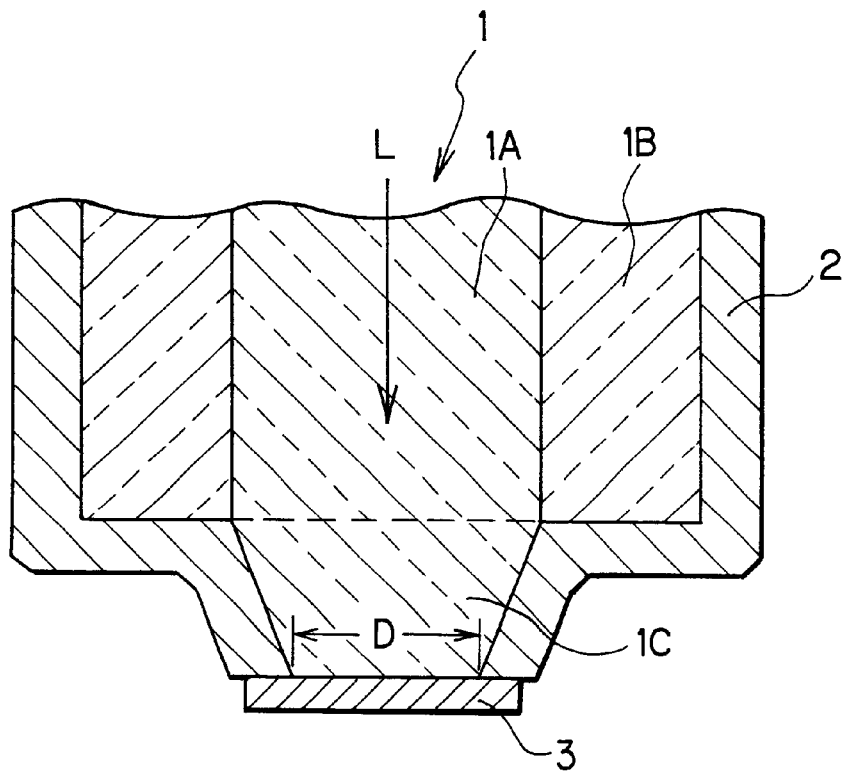
FIG. 2A is a schematic axial cross sectional view of an optical fiber-based optical near-field probe according to the present invention.

FIG. 2A shows an axial cross sectional view of an embodiment of the inventive optical near-field probe which generally has the same structure as that of the conventional probe shown in FIG. 1 except that the top flat of the truncated conical part 1C has a diameter D larger than the desired aperture diameter, typically, in the range from 15 to 500 nm and a thin film 3 is attached to the top flat of the truncated conical part 1C. The thin film 3 is made from an opaque material which, however, can be reversibly or irreversibly rendered transparent by irradiation with light of an intensity exceeding a certain critical limit.

The thin film 3 can be formed from a variety of phase-transformation materials used as the recording material in rewritable disk memory devices including antimony and antimony-based alloys, and photochromic compounds such as diarylethene compounds such as diphenyl ethene or stilbene, spiropyran compounds, spirobenzopyran compounds, spirooxazine compounds, fulgide compounds and the like. The thin film 3 has a thickness in the range from 5 to 300 nm.

Figure 2B:
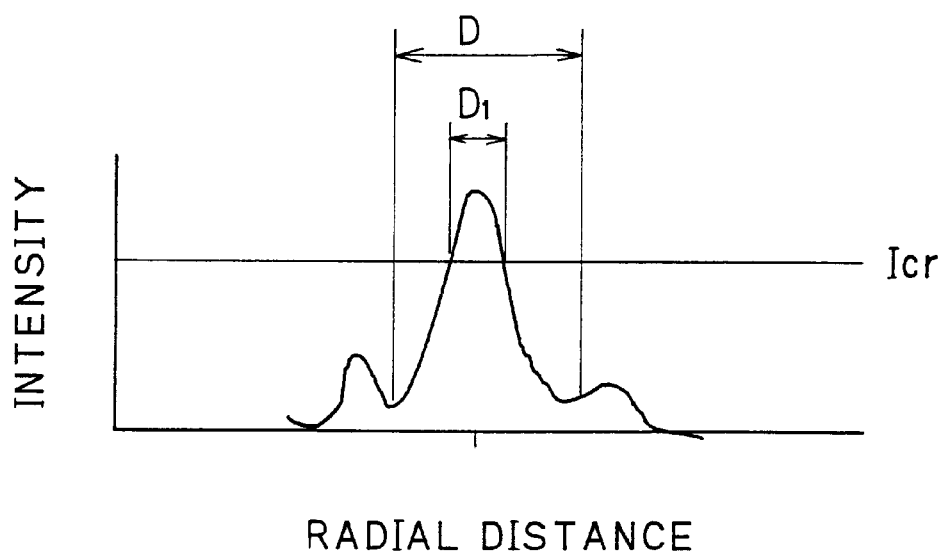
FIG. 2B is a graph showing a radial distribution of intensity of light transmitted through the optical near-field probe illustrated in FIG. 2A.

When a laser beam L is introduced into the core 1A of the optical fiber 1 as the incident light, the laser beam L transmitted through the core 1A is reflected at the side surface of the truncated conical part 1C by the metallic coating film 2 to be gathered to the center portion of the end opening to be emitted therefrom. FIG. 2B is a graph showing the radial distribution of the intensity of the light thus emitted out of the open end of the probe to enter the thin film 3 indicating that the intensity is high only in the center portion of the open end having a diameter of Dl. Assuming that the light intensity is high enough at the center portion of the end opening to exceed the critical intensity Icr above which the opaque substance forming the thin film 3 is converted into a transparent material, the light beam transmitted through the thin film 3 has an effective diameter D1, referred to as the optical aperture hereinafter, corresponding to the center portion of the intensity distribution curve in FIG. 2B. When the thin film 3 is formed from a photochromic compound of which the photochromic transformation is temperature-dependent, control of the temperature of the thin film 3 provides a means for varying the diameter of the optical aperture of the probe to exhibit the same effect as obtained by varying the intensity of the incident laser beam. Typically, the diameter of the optical aperture can be varied in the range from 10 to 200 nm.

In the optical near-field probe with aperture according to the invention, as is described above, the effective aperture diameter is not determined by the geometrical diameter D of the top flat of the truncated conical part 1C of the optical fiber but can be controlled by modifying the intensity of the incident laser beam so that a very fine optical aperture can be obtained by controlling the intensity of the incident laser beam or by controlling the temperature of the thin film 3 with the open end of the truncated conical part 1C to conform with the center region where the transmissivity of light is large.

In the application of such an optical near-field probe to a scanning near-field optical microscope, the light beam used for observation of the objective sample can be used for the formation of the optical aperture. In the application to optical near-field recording, the light beam used for writing-in of or for reading-out of the recorded marks serves as such for the formation of the optical aperture. It is alternatively optional that the optical aperture is formed with light of a different wavelength apart from the above mentioned lights for dual services. The light for the formation of the optical aperture can be separated from the light for observation of sample marks or the light for writing and reading of the recorded marks by using a filter.

In the following, the optical near-field probe of the present invention is described in more detail by way of

EXAMPLES

Example 1

An optical fiber-based optical near-field probe having a structure illustrated in FIG. 2A was prepared by using antimony as a material susceptible to reversible changes of transparency by irradiation with light to form a thin film 3 having a thickness of 20 nm. The antimony film as formed consisted of a crystalline phase and was opaque but could be converted into an amorphous phase having transparency to light by irradiating with light of high intensity generating heat to increase the temperature of the film while opacity of the film 3 due to crystallinity was regained by decreasing the temperature with interruption of light irradiation. The thin film 3 of antimony was overcoated with a protective film of silicon nitride having a thickness of 20 nm which prevented sublimation of antimony from the thin film to ensure stability of performance of the probe.

A laser beam of 680 nm wavelength was introduced into this probe as the incident light so that an optical aperture was formed in the antimony film to give an optical near-field spot, which had a variable diameter of about 50 nm at the smallest depending on the intensity of the incident light while the open end of the probe had a geometrical diameter of 400 nm.

Example 2

An optical fiber-based optical near-field probe having a structure similar to that prepared in Example 1 and illustrated in FIG. 2A was prepared by using diphenyl ethene known as a photochromic compound as the material of the thin film 3 having a thickness of about 100 nm. After the diphenyl ethene film was rendered colored and opaque by irradiation with ultraviolet light, a laser beam of 530 nm wavelength was introduced into the probe as the incident light so that a very small spot-wise center area of the diphenyl ethene film regained transparency by quenching of the color. The diameter the transparent area thus formed was proportional to the product of the intensity of the laser beam and the length of time for the laser beam introduction and could be about 30 nm at the smallest while the open end of the probe had a geometrical diameter of 400 nm. Transparency of the very small center area was retained even after interruption of the laser beam introduction so that an optical near-field spot having a diameter close to that of the transparent area could be formed by introduction of a laser beam of 680 nm wavelength incapable of pertaining to the color quenching reaction. The thus color-quenched area could again be rendered colored and opaque by irradiating with ultraviolet light.

What is claimed is:

1. A variable-aperture optical near-field probe having an objective end opening to which a thin film of an opaque material capable of being rendered transparent by irradiation with light is attached.

2. The variable-aperture optical near-field probe as claimed in claim 1 in which the thin film is formed from an opaque material capable of being rendered transparent reversibly by irradiation with light.

3. The variable-aperture optical near-field probe as claimed in claim 1 in which the material forming the thin film is antimony.

4. The variable-aperture optical near-field probe as claimed in claim 3 in which the thin film formed from antimony has a thickness in the range from 5 to 50 nm.

5. The variable-aperture optical near-field probe as claimed in claim 1 in which the material forming the thin film is a photochromic compound.

6. The variable-aperture optical near-field probe as claimed in claim 5 in which the photochromic compound is diphenyl ethene.

7. The variable-aperture optical near-field probe as claimed in claim 5 in which the thin film formed from a photochromic compound has a thickness in the range from 5 to 300 nm.

8. The variable-aperture optical near-field probe as claimed in claim 1 in which the objective end opening has a geometrical diameter in the range from 15 to 500 nm.

* * * * *